United States Patent [19]
Rolfe

[11] B 3,913,884
[45] Oct. 21, 1975

[54] VARIABLE BLEED VALVE

[75] Inventor: Alfred H. Rolfe, Pottersville, N.J.

[73] Assignee: Automatic Switch Company, Florham Park, N.J.

[22] Filed: July 9, 1973

[21] Appl. No.: 377,833

[44] Published under the Trial Voluntary Protest Program on January 28, 1975 as document no. B 377,833.

[52] U.S. Cl.................................. 251/35; 251/30
[51] Int. Cl.²........................................ F16K 31/385
[58] Field of Search................................ 251/35, 30

[56] References Cited
UNITED STATES PATENTS

| | | | |
|---|---|---|---|
| 1,828,517 | 10/1931 | White.................................... | 251/35 |
| 2,000,297 | 5/1935 | Putnam................................ | 251/35 X |
| 2,310,130 | 2/1943 | Thumim et al. .................... | 251/35 X |
| 3,061,264 | 10/1962 | Rupert................................. | 251/35 |
| 3,177,891 | 4/1965 | Reese.................................. | 251/35 X |

FOREIGN PATENTS OR APPLICATIONS

117,468   1943   Australia................................ 251/35

*Primary Examiner*—Arnold Rosenthal
*Attorney, Agent, or Firm*—Alan H. Levine

[57] ABSTRACT

A valve including an inlet port, an outlet port, an orifice between the ports surrounded by a valve seat, and a valve member supported by a diaphragm above the valve seat. Above the diaphragm the valve includes a chamber connected by a bleed passageway to the inlet port and by a conduit to a pilot valve for selectively venting the chamber. A slidable blocking means or plug is provided responsive to the pressure difference between the chamber and inlet port. The plug closes the bleed passageway when the pressure in the chamber rises close to valve inlet pressure and the plug opens the passageway only when the pressure in the chamber falls to a relatively low value. Thus, with fluid pressure applied at the inlet port, when the pilot valve is opened the bleed passageway remains closed until the pressure in the chamber falls and the valve member moves away from the valve seat. When the pilot valve is closed the bleed passageway remains open until the pressure in the chamber rises high enough to cause closing movement of the valve member. As a result, a pressure pulse having small rise and fall times is provided at the outlet port.

10 Claims, 4 Drawing Figures

VARIABLE BLEED VALVE

This invention relates to pilot operated valves and especially to pneumatic valves adapted to provide a well defined pulse of air each time the pilot is opened and closed. However, it is to be understood that the valve has utility with fluids generally.

In valves of the type to which the invention relates, it is common to have a bleed passageway through which high pressure fluid at the inlet to the valve can flow into a chamber on the side of the main valve member opposite the valve seat. As a result, the pressure in the chamber rises to inlet pressure and this pressure urges the valve member against the valve seat to keep the valve closed. A pilot valve is used to relieve the pressure in the chamber when the main valve is to be opened. However, when the pilot valve is opened, high pressure fluid continues to flow through the bleed passageway into the chamber. Therefore, although the flow path from the chamber through the pilot valve is of larger diameter than that of the bleed passageway, the continuous flow high pressure fluid into the chamber slows down the reaction time of the main valve member to opening of the pilot valve, i.e., the fluid pulse produced upon opening of the main valve has a relatively large rise time.

It is a general object of the invention to provide a pilot operated valve which can be used to supply air pulses having small rise and fall times.

It is another object of the present invention to provide a valve which can be used to provide air pulses of large volume and short duration.

It is a further object of the invention to provide a valve, of the type described above, having means for temporarily blocking the bleed passageway when the pilot valve is opened so that no high pressure fluid enters the chamber during the initial opening movement of the main valve member.

A practical application of the subject valve is in apparatus for shaking air filter bags of dust collector equipment. Such bags are most effectively cleaned by a momentary pulse of air or gas of large volume and short duration. In the past, filter bag shaking apparatus has required a relatively complex and expensive arrangement of individual valves and pneumatic circuit connections to shake the bags. In contrast, the invention provides a relatively simple valve for producing the desired pulses, with a consequent saving in the cost of controls, piping, compressors, and associated equipment which would otherwise be required.

In summary, a valve according to the invention comprises: a main body having an inlet port, an outlet port, and an orifice between said ports surrounded by a valve seat; a valve member within said body, said valve member being movable into and out of engagement with the valve seat to close and open the valve, respectively; a chamber on the side of said valve member opposite the valve seat; a pilot valve for controlling the pressure in the chamber; a bleed passageway coupling the inlet port of the main valve to the chamber; and a movable blocking means responsive to the pressure differential between the chamber and the inlet port of the main valve. The blocking means, which may be in the form of a plug, closes the bleed passageway when the pressure in the chamber rises close to valve inlet pressure, and the plug opens the passageway only when the pressure in the chamber falls to a relatively low value. Thus, with fluid pressure applied to the inlet port of the main valve, when the pilot valve is opened the bleed passageway remains closed until the pressure in the chamber falls and the main valve member moves away from the valve seat. When the pilot valve is closed the passageway remains open until the pressure in the chamber rises enough to cause closing movement of the valve member. Consequently, a pressure pulse having small rise and fall times is provided at the outlet port of the valve.

Additional features and advantages of the invention will be apparent from the following description in which reference is made to the accompanying drawings.

In the drawings:

FIG. 4 is a cross-sectional view taken along line 4—4 of FIG. 1.

Figure 1:
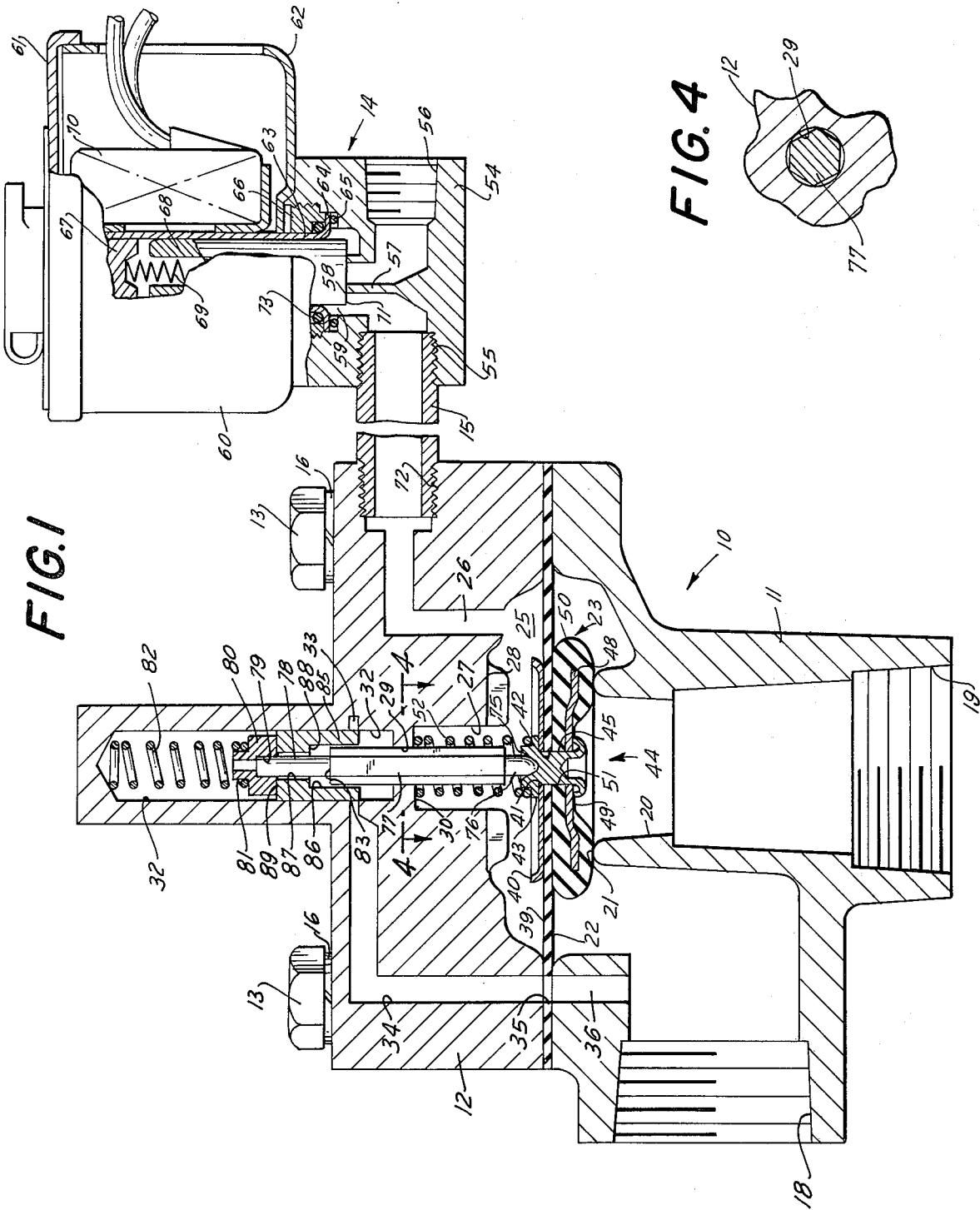
FIG. 1 is a cross-sectional view of a valve, according to the invention, showing the main and pilot valves in their closed positions.

The valve 10 chosen to illustrate this invention includes a valve body comprising sections 11 and 12 fastened together by bolts 13 and lock washers 16, and a solenoid actuated pilot valve 14 connected by a tubular coupling 15 to body section 12.

Body section 11 is formed with an inlet port 18, an outlet port 19, both adapted for connection to conduits, an orifice 20 between the two ports, and a valve seat 21 surrounding the orifice. A diaphragm 22, formed of a suitable flexible and resilient material such as rubber, extends above the orifice 20, the margin of the diaphragm being sandwiched between the body sections 11 and 12. As more fully discussed below, a main valve member 23 carried by the diaphragm 22 is movable into and out of engagement with the valve seat 21 to close and open the main valve, respectively.

Body section 12 includes a chamber 25 adjacent to and above the diaphragm 22. Chamber 25 communicates with a conduit 26 also formed in body section 12, and a large bore 27 extends upwardly from the top wall 28 of the chamber. A small circular bore 29 (see also FIG. 4) extending upwardly from the top wall 30 of bore 27 communicates with an elongated bore 32, bores 27, 29, and 32 being axially aligned. Elongated bore 32 includes, in a plane perpendicular to its axis, an annular slot 33 which communicates with a passageway 34 formed in body section 12. Passageway 34 communicates with the inlet port 18 via a hole 35 in the diaphragm 22 and a passageway 36 in body section 11. Thus, a fluid passageway exists, between the inlet port 18 and chamber 25, comprising passageway 34, 36, slot 33, and bores 32, 29, and 27.

Figure 2:
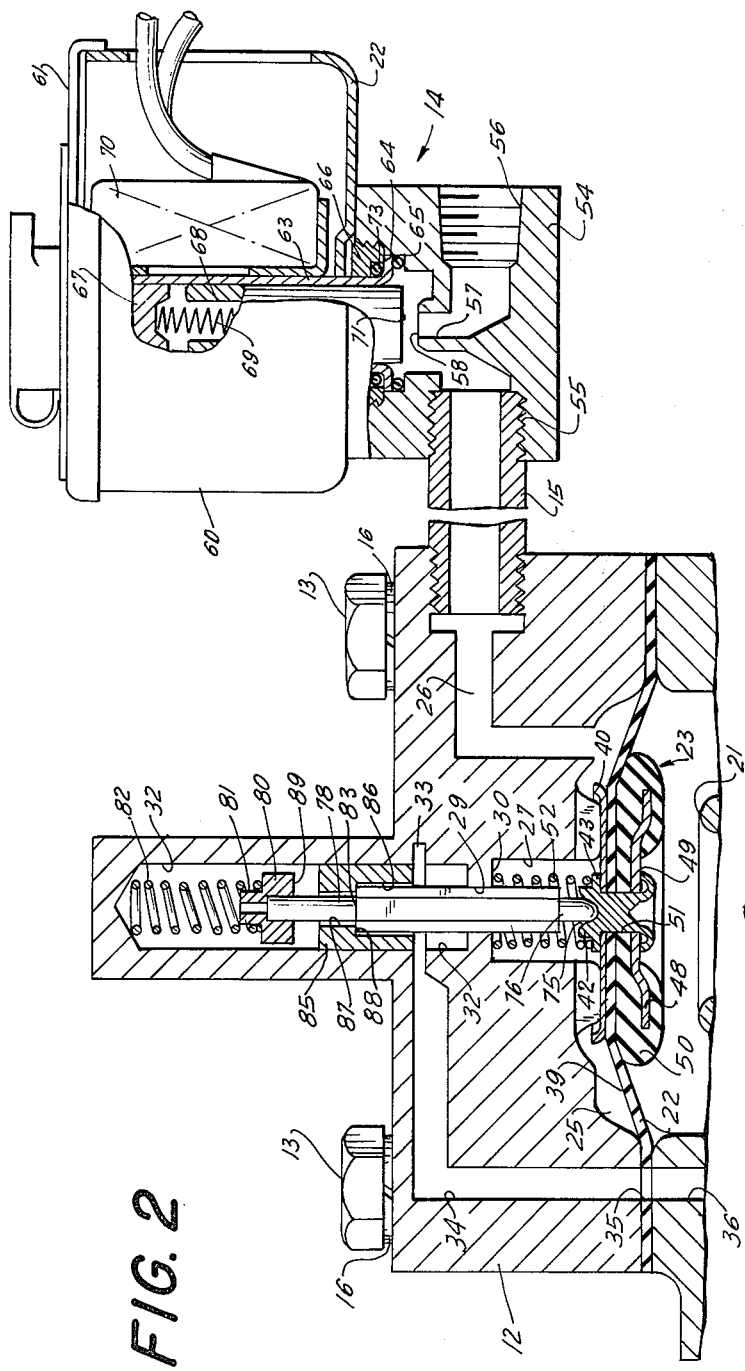
FIG. 2 is a partial cross-sectional view of the valve showing the main and pilot valves open.
Figure 3:
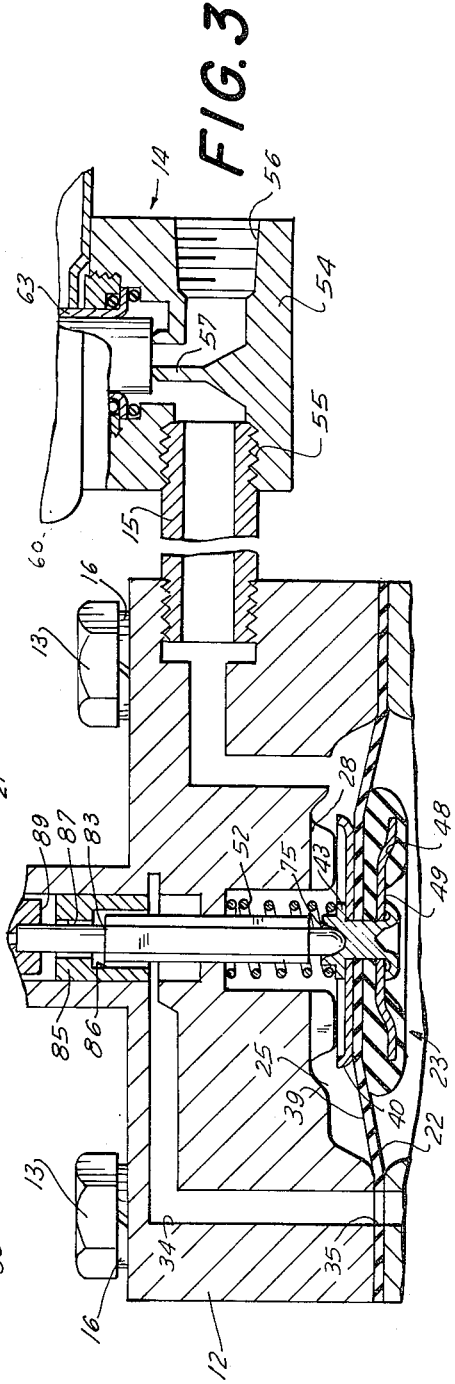
FIG. 3 is a partial cross-sectional view of the valve showing the pilot valve closed and the main valve in the process of closing.

Diaphragm 22 supports adjacent its upper surface 39 a pressure distributing disk 40 having a centrally located hole 41 located above a similar hole 42 in the diaphragm. Disk 40 supports a flange 43 on a coupling 44 whose stem 45 extends through holes 41 and 42 and engages valve member 23. Valve member 23 is a rigid circular disk 48, all but a centrally located area 49 on one side of which is coated with a resilient material 50, such as rubber, to provide an effective seal with seat 21. In addition, the valve member includes a centrally located hole 51 for accommodating the stem 45. As shown in FIGS. 1–3, stem 45 extends through hole 51 and is peened into abutment with area 49, thereby sandwiching the diaphragm between the pressure distributing disk 40 and the resilient material 50.

Within bore 27 there is a compression spring 52. One end of the spring 52 abuts the top wall 30 of the bore, and the other end of spring 52 is seated on flange 43. Thus, the pressure of fluid in chamber 25 combined with the force exerted by spring 52 urges diaphragm 22 downwardly and the resilient material 50 of valve member 23 against seat 21 to close the main valve, as shown in FIG. 1.

The solenoid actuated pilot valve 14 includes a body 54 having an inlet port 55, an outlet port 56, both adapted for connection to tubular couplings, an orifice 57 between the two ports, and a valve seat 58 surrounding the orifice. Above the valve seat the pilot valve includes a cavity 59 which communicates with the inlet port 55 and is threaded for engagement with a solenoid assembly. The solenoid assembly comprises a housing having opposed walls 61 and 62. Aligned openings, only one of which is shown, are formed in these walls to allow the opposite ends of a core tube 63 to project outwardly beyond them. One end of the core tube is flared and provides a flange 64 which is pressed against an O-ring 65 seated in the cavity 59 by an externally threaded nut 66 which engages the thread of the cavity. In addition, the threaded nut includes a circular groove accommodating an O-ring 73 pressed against the flaring part of the tube for providing a fluid tight coupling between the core tube 63 and the body 54. Core tube 63 encloses a fixed plug nut 67 and a slidable core 68. A compression spring 69, located within a bore in core 68, is seated at its upper end against plug nut 67 and urges core 68 toward valve seat 58. A solenoid winding 70 when energized, moves core 68 away from valve seat 58. Thus, the end 71 of the slidable core 68 serves as a valve member responsive to the flow or lack of flow of current through the solenoid winding 70 to open and close the pilot valve. Inlet port 55 is connected by coupling 15 to a tapped hole in body 12 which communicates with conduit 26. Thus, the pilot valve may be used to rapidly vent chamber 25, for example, to atmosphere.

Referring to FIGS. 1 and 4, coupling 42 includes, on its top surface, a depression 75 which a bottom end section 76 of a stem abuts. The central section 77 of the stem has a hexagonal cross-section (see FIG. 4) and a diameter sufficient to provide a slidable engagement between the central section and the circular bore 29. As a result, the stem does not prevent the flow of fluid between bores 27 and 32. The upper end section 79 of the stem is cylindrical, has a smaller diameter than the central section 77, and extends upwardly from the upper end 83 of the central section into engagement with a hole 79 in a cap 80. Cap 80 is a circular structure having on its top surface a boss 81 which is surrounded by an end of a compression spring 82 seated against the top surface of cap 80. The other end of the compression spring 82 abuts the top end of bore 32. Thus, spring 82 biases the stem against coupling 42.

Below the cap 80, bore 32 frictionally but slidably supports a blocking means shown in the form of a cylindrical plug 85, which surrounds the stem. The plug has a large bore 86 and a small bore 87 extending upwardly from the top wall 88 of the large bore 86. The length of bore 87 is less than the length of the stem upper section 78 between the cap 80 and the upper end 83 of the central stem section 77. The diameter of bore 86 is larger than the diameter of the central section 77. As shown in FIG. 1, when the valve member 23 is seated, cap 80 is in abutment with the cylindrical plug 85 and the length of the plug is sufficient to completely or almost completely block the flow of fluid from circumferential slot 33 into bore 32, i.e., the fluid path from inlet 18 to chamber 25 is substantially closed. As more fully described below, the lower face 89 of cap 80 and the upper end 83 of stem section 77 provide the stem with abutments for moving plug 85.

Functionally, if it is assumed that the pilot valve is closed, i.e., end 71 is seated on valve seat 58, and the pressure in the chamber 25 is sufficient to keep valve member 23 seated, current applied to the solenoid winding 70 rapidly opens the pilot valve (see FIG. 2), and the fluid under pressure in chamber 25 exits, via conduit 26, through the outlet port 56. As a result, pressure in the chamber drops rapidly and fluid pressure at the inlet port 18 lifts diaphragm 22 and valve member 23, against the forces of springs 52 and 82, thereby permitting fluid to flow from the inlet port 18 to the outlet port 19. It will be noted that during most of the upward movement of valve member 23, i.e., the movement equal to the distance shown in FIG. 1, between upper end 83 of stem section 77 and the top wall 88 of bore 86 in plug 85, little or no high pressure fluid is permitted to flow into chamber 25 from inlet 18. Consequently, when pilot valve 14 opens, the pressure in chamber 25 drops very rapidly and hence main valve 10 opens very rapidly.

As valve 23 completes its upward movement, the upper end 83 of the central section 77 of the stem abuts the top wall 88 of the plug 85 and moves the plug upwardly to the position shown in FIG. 2, thereby permitting high pressure fluid from the inlet port 18 to enter bore 32 and hence chamber 25 via slot 33. However, this fluid flows right through chamber 25 and out through conduit 26 and opens pilot valve 14. Consequently, the open condition of valve 10 is not affected.

With the plug 85 in its upper position (FIG. 2), if pilot valve 14 is closed, fluid from inlet port 18 entering chamber 25, causes pressure to build up rapidly in chamber 25. As the pressure builds up, valve 23 is moved rapidly toward its seat 21 both by the pressure and spring 52. At the same time, spring 82 moves cap 80 and the stem downwardly (see FIG. 3). Just before valve member 23 becomes seated, the lower face 89 of cap 80 abuts the plug 85 and moves it downwardly to the position shown in FIG. 1. Plug 85 therefore blocks further flow of fluid into the bore 32 and chamber 25 as the valve is seated (see FIG. 1). Since full fluid flow from inlet port 18 is permitted to charge the chamber 25 until seating of valve member 23 is almost complete, valve 10 closes rapidly.

From the foregoing, it may be seen that pressure pulses at the outlet port 19 have small rise times because plug 85 limits or prevents the entry of fluid from the inlet port 18 into the chamber 25 until the pressure in the chamber has dropped sufficiently and valve 23 is just about fully open. Small fall times are exhibited by the pulses provided because chamber 25 is charged at a maximum rate until valve 23 is just about closed. Accordingly, passageway 34, 35, 36 and movable plug 85 may be thought of as a variable bleed passageway which reduces the time required to open and close the valve.

Although the valve described above incorporates a solenoid actuated pilot valve, it should be noted that there exists suitable substitutes. For example, an air operated valve responsive to small pressure pulses may be used to vent the chamber 25. Thus, the valve may be controlled by lines to a remote timing or control which can be either electrical or fluidic.

Accordingly, it is to be understood that the description herein of a preferred embodiment according to the invention is set forth as an example thereof and is not to be construed or interpreted as a limitation on the claims which follow and define the invention.

What is claimed is:

1. A valve comprising:
   a. a valve body having an inlet port, an outlet port, and an orifice between said ports surrounded by a valve seat;
   b. a valve member within said body, said valve member being movable between a valve-closed position, in which it engages said valve seat, and a valve-open position, in which there is a maximum possible spacing between said valve member and said valve seat;
   c. a chamber on the side of said valve member opposite said valve seat;
   d. means for relieving the pressure in said chamber when desired;
   e. a bleed passageway coupling said inlet port of the valve to said chamber;
   f. a blocking means movable with respect to said bleed passageway between a blocking position in which it obstructs flow therethrough into said chamber and a flow-permitting position in which it permits full flow therethrough into said chamber, said blocking means being arranged in its blocking position when said valve member is in its valve-closed position; and
   g. means responsive to only the final portion of the movement of said valve member from its valve-closed position to its valve-open position for moving said blocking means from its blocking position to its flow-permitting position and responsive to only the final portion of the movement of said valve member from its valve-open position to its valve-closed position for moving said blocking means from its flow-permitting position to its blocking position, each of said final portions amounting to less than one-half the distance through which said valve member moves between its valve-open and valve-closed positions, whereby fluid flow from said inlet port to said chamber is obstructed until the valve is almost completely open at which time such flow is permitted and full fluid flow from said inlet port to said chamber is permitted until the valve is almost completely closed at which time such flow is obstructed.

2. A valve as defined in claim 1 wherein said means (g) includes a rigid stem movable with said valve member, said stem carrying spaced apart and opposed abutment means, and said blocking means having a portion arranged between said abutment means, the spacing between said abutment means being greater than the dimension of said blocking means portion in the direction of said spacing, whereby only a portion of the movement of said stem is transmitted to said blocking means.

3. A valve as defined in claim 1 wherein said means (d) includes a pilot valve and conduit means connecting said pilot valve to said chamber.

4. A valve as defined in claim 1 wherein said means (g) includes means for transmitting movements of said valve member to said blocking means.

5. A valve as defined in claim 4 wherein said movement transmitting means includes a rigid stem arranged between said valve member and said blocking means, said stem being slidable with respect to said valve body.

6. A valve as defined in claim 1 including a bore in said valve body extending from said chamber, said bleed passageway including an opening in the wall of said bore, and said blocking means is slidable within said bore into and out of registry with said opening.

7. A valve as defined in claim 6 wherein said means (g) includes a rigid stem engaging said valve member, said stem carrying spaced apart and opposed abutment means, and said blocking means having a portion arranged between said abutment means, whereby movement of said valve member is transmitted by said stem and abutment means to said blocking means.

8. A valve as defined in claim 7 wherein the spacing between said abutment means is greater than the dimension of said blocking means portion in the direction of said spacing, whereby only a portion of the movement of said stem is transmitted to said blocking means.

9. A valve as defined in claim 6 wherein said blocking means is snugly but slidably accommodated within said bore.

10. A valve as defined in claim 9 wherein said bore is cylindrical and the outer contour of said blocking means is cylindrical and slightly smaller in diameter than the diameter of said bore.

* * * * *